(12) United States Patent
Koshimizu et al.

(10) Patent No.: US 11,723,117 B2
(45) Date of Patent: Aug. 8, 2023

(54) MOBILITY LEVEL CONTROL DEVICE AND MOBILITY LEVEL CONTROL METHOD

(71) Applicant: NTT DOCOMO, INC., Tokyo (JP)

(72) Inventors: Takashi Koshimizu, Tokyo (JP); Irfan Ali, Istanbul (TR); Syed Husain, Chicago, IL (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/300,106

(22) PCT Filed: May 11, 2017

(86) PCT No.: PCT/JP2017/017807
§ 371 (c)(1),
(2) Date: Nov. 9, 2018

(87) PCT Pub. No.: WO2017/195860
PCT Pub. Date: Nov. 16, 2017

(65) Prior Publication Data
US 2019/0150226 A1    May 16, 2019

(30) Foreign Application Priority Data

May 13, 2016   (JP) .................................. 2016-097251

(51) Int. Cl.
*H04W 88/18*        (2009.01)
*H04W 8/08*         (2009.01)
(Continued)

(52) U.S. Cl.
CPC .......... *H04W 88/184* (2013.01); *H04W 8/08* (2013.01); *H04W 8/26* (2013.01); *H04W 68/02* (2013.01);
(Continued)

(58) Field of Classification Search
CPC ....... H04W 88/184; H04W 8/08; H04W 8/26; H04W 68/02; H04W 68/04; H04W 88/18; H04W 60/04
See application file for complete search history.

(56) References Cited

U.S. PATENT DOCUMENTS

2015/0215895 A1   7/2015   Iwai et al.
2017/0150343 A1   5/2017   Iwai

FOREIGN PATENT DOCUMENTS

| JP | 201423017 A | 2/2014 |
|---|---|---|
| WO | 2014/013660 A1 | 1/2014 |
| WO | 2016/009579 A1 | 1/2016 |

OTHER PUBLICATIONS

International Search Report issued in PCT/JP2017/017807, dated Jul. 25, 2017 (4 pages).

(Continued)

*Primary Examiner* — Eric Myers
(74) *Attorney, Agent, or Firm* — Osha Bergman Watanabe & Burton LLP (57) ABSTRACT

An MS 300 controls a mobility level (IMM) of user device in an idle mode depending on a movement; state of the user device. The ME 300 includes a movement state acquisition section 320 that acquires the movement state of the user device, a mobility level selector 330 chat selects a mobility level out of the multiple mobility levels based on the movement state of the user device acquired by the movement state acquisition section 320, and a mobility level notification section 340 that notifies the user device of the mobility level selected by the mobility level selector 330.

4 Claims, 7 Drawing Sheets

(51) Int. Cl.
    *H04W 8/26* (2009.01)
    *H04W 68/02* (2009.01)
    *H04W 68/04* (2009.01)
    *H04W 60/04* (2009.01)

(52) U.S. Cl.
    CPC ........... *H04W 68/04* (2013.01); *H04W 88/18* (2013.01); *H04W 60/04* (2013.01)

(56) References Cited

OTHER PUBLICATIONS

Written Opinion of the International Searching Authority issued in PCT/JP2017/017807, dated Jul. 25, 2017 (8 pages).
Nokia; "Solution: Mobility Options"; SA WG2 Meeting #S2-114, S2-161625; Sophia Antipolis, France; Apr. 11-15, 2016 (5 pages).
Office Action issued in Japanese Application No. 2018-517074; dated May 25, 2021 (6 pages).
Office Action issued in the counterpart Chinese Patent Application No. 201780029658.7, dated Jan. 20, 2021 (13 pages).
Office Action issued in the counterpart Chinese Patent Application No. 201780029658.7, mailed on Jul. 20, 2021 (22 pages).
Notice of Reasons for Refusal issued in Japanese Application No. 2018-517074 dated Dec. 22, 2021 (6 pages).
Office Action issued in the counterpart Chinese Patent Application No. 201780029658.7, dated Mar. 9, 2022 (14 pages).
Decision to reject issued in Chinese Application No. 201780029658.7 dated Oct. 27, 2022 (11 pages).

MOBILITY LEVEL CONTROL DEVICE AND MOBILITY LEVEL CONTROL METHOD

TECHNICAL FIELD

The present invention relates to a mobility level control device and a mobility level control method for controlling the mobility level of user device in an idle mode.

BACKGROUND ART

3rd Generation Partnership Project (3GPP) specifies, with the aim of further speeding Long Terra Evolution (LTE) LTE-Advanced (hereinbelow, the LTE includes the LTE-Advanced). Moreover, in the 3GPP, specification of succeeding systems of the LTE called 5G (5th generation mobile communication system) and the like is being considered.

In this succeeding system, more types of user device than ever are expected to be used, such as user device for Internet of Things (IoT) and user device for non-IoT. For this reason, it has been discussed to define multiple mobility levels of user device in an idle mode (for example, Non-Patent Document 1). Achieving this makes it possible to reduce a load to manage user device and improve quality of service at the same time.

In a specific idea under consideration, one of multiple mobility levels including one for low movement frequency (or movement degree, the same applies hereafter) to one for high movement frequency is set for user device depending on the type and features of the user device.

PRIOR ART DOCUMENT

Non-Patent Document

Non-Patent Document 1: Solution: Mobility Options, SA WG2 Meeting #114, S2-161625, 3GPP, April 2016

SUMMARY OF THE INVENTION

However, setting the mobility level for user device as described above involves the following problem. That is, because one of mobility levels is fixedly set for each user devices there could be some cases where, if the movement state of the user device, or, the mobility level of the user device changes, the actual movement state does not agree with the mobility level already set for the user device.

For example, when user device connected to a temperature sensor is installed indoors, a mobility level for low movement frequency is set in general. Later, if the user device is relocated to a vehicle or the like for another usage, the user device may frequently move. Hence, the mobility level for low movement frequency may not provide enough quality of service required for the user device.

Hence, the present invention has been made in view of the above situation, an objective thereof is to provide a mobility level control device and a mobility level control method that make it possible to select a suitable mobility level even when the mobility level of user device in an idle mode dynamically changes.

An aspect of the present invention is a mobility level control device (ME 300) that controls a mobility level (IMM) of user device (UE 100) in an idle mode depending on a movement state of the user device, including: a movement state acquisition section (movement state acquisition section 320) that acquires the movement state of the user device; a mobility level selector (mobility level selector 330) that selects a mobility level out of the multiple mobility levels based on the movement s tats of the user device acquired by the movement state acquisition section; and a mobility level notification section (mobility level notification section 340) that notifies the user device of the mobility level selected by the mobility level selector.

An aspect of the present invention is a mobility level control, method for a control device that controls a mobility level of user device in an idle mode depending on a movement state of the user device, including the steps of: selecting a mobility level, by the control device, out of the multiple mobility levels based on the movement state of the user device; and notifying the user device, by the control device, of the selected mobility level.

MODES FOR CARRYING OUT THE INVENTION

Next, an embodiment of the present invention will be described based on the drawings. Note that the same or similar reference signs denote the same or similar functions and structures, and descriptions thereof are omitted as appropriate.

(1) Overall Schematic Configuration of Radio Communication System

Figure 1:
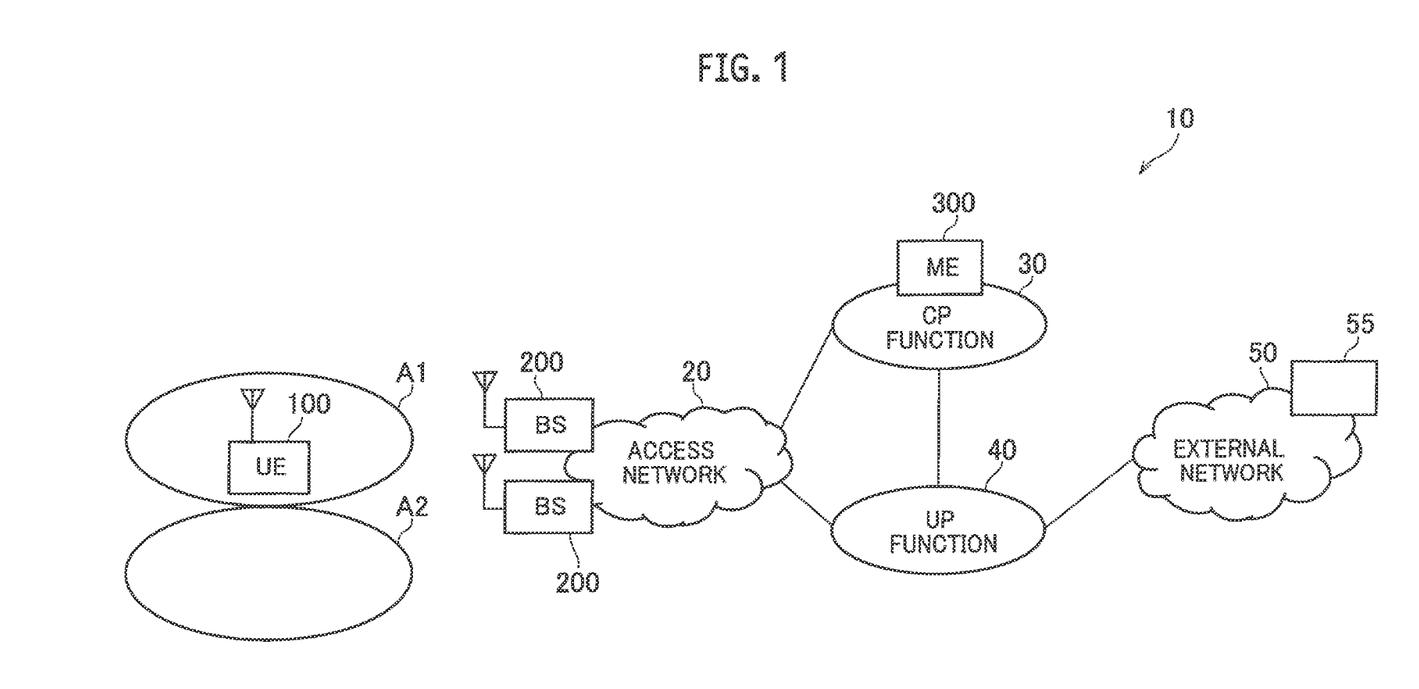
FIG. 1 is an overall schematic configuration diagram of a radio communication system 10.

FIG. 1 is an overall schematic configuration diagram of a radio communication system 10 according to the present embodiment. The radio communication system 10 conforms to "5G", which is the succeeding system of Long Term Evolution (LTE). Note that the radio communication system 10 may be referred to as future radio access (FRA) or a next generation system (NextGen).

As illustrated in FIG. 1, the radio communication system 10 includes a radio access network 20, a core network control plane function 30 (hereinafter, CP function 30), a core network user plane function 40 (hereinafter, UP function 40), and user device (user equipment) 100 (hereinafter, UE 100). In addition, an external network 50 is connected to the radio communication system 10, more specifically, to the UP function 40.

The radio access network 20, for example, conforms to radio access technology (RAT) specified in the 3rd Generation Partnership Project (3GPP), and includes radio base stations 200 (hereinafter, BSs 200).

The CP function 30 and the UP function 40 are connected to the radio access network 20. The CP function 30 and the UP function 40 provide a control plane function and a user plane function in the core network of the radio communication system 10. In other words, in the core network of the radio communication system 10, a configuration (CUPS: C/U plane separation) is employed in which the control plane function for controlling the UE 100, the BSs 200, and the like, and the user plane function for transmitting and receiving user data and the like are clearly separated. The CP function 30 and the UP function 40 each includes a serving gateway (SGW), a PDN gateway (PGW), a traffic detection function (TDF) and the like.

The external network 50 is connected to the UP function 40. Although a typical example of the external network 50 is the Internet, the type of the external network 50 is not particularly limited. The external network 50 may be a private network provided by the operator or the like of the radio communication system 10.

A data repository 55 is provided to the external network 50. The data repository 55 stores data transmitted from the OB 100 (later-described IMM level and the like).

The UE 100 and the BSs 200 perform radio communication following a radio communication technique specified in the 3GPP. The type of the UE 100 is not particularly limited in this embodiment. The UE 100 may be user device for Internet of Things (IoT), for example, machine type communication (MTC), or may be user device for non-IoT, such as conventional smartphones.

The movement, frequency or the movement degree of UE 100 can vary depending on the type or the purpose thereof as described above. The movement frequency means a count of movements of the UE 100 within a specified time, and is not associated with the distance of movement. On the other hand, the movement degree typically means the distance of movement within a specified time. However, the movement degree is not necessarily a distance, but may be a unit by which a degree of geographic movement can be determined, such as a tracking area (TA) described later. Hereinafter, at least one of movement frequency and a movement degree of the UE 100 as above is referred to as a "movement state".

Depending on the type and the purpose as described above, the movement stats of UE 100 may vary from a state of no movement to a state of moving at a high speed. In this embodiment, multiple mobility levels are defined corresponding to movement states of the UE 100, and a mobility level is selected out of the multiple mobility levels depending on the movement state of the UE 100 that dynamically changes.

A mobile control entity 300 (hereinafter, ME 300) is one of devices included in the CP function 30. In this embodiment, the ME 300 constitutes the mobility level control device.

The ME 300 controls the mobility level of the UE 100 in an idle mode depending on the movement state of the UE 100.

The idle mode means a state in which although the UE 100 is connected to a core network constituted by the CP function 30 and the UP function 40, the UE 100 has no active route of the user plane (also referred to as a user data path, a bearer or connection for user data, or the like). The movement state of the UE 100 in the idle mode can change depending on the type and the purpose thereof as described above.

The ME 300 is capable of updating the mobility level of the UE 100 as appropriate by controlling the mobility level of the UE 100 in the idle mode. For example, the ME 300 is capable of controlling the mobility level of the UE 100 when the UE 100 establishes connection for packet data (PDN Connection). Note that hereinafter the mobility level of the UE 100 in the idle mode is referred to as Idle Mode Mobility (IMM) as appropriate.

The ME 300 dynamically selects the most suitable mobility level corresponding to the movement state of the UE 100. In addition, acquiring the movement state of the UE 100 periodically, the ME 300 can update the mobility level of the UE 100 based on the latest movement state of the UE 100, Considering this function that the ME 300 provides, the ME 300 may be called On Demand Management Entity, for example.

(2) Functional Block Configuration of Radio Communication System

Next, descriptions will be provided for the functional, block configuration of the radio communication system 10, Specifically, the functional block configuration of the ME 300 will be described.

Figure 2:
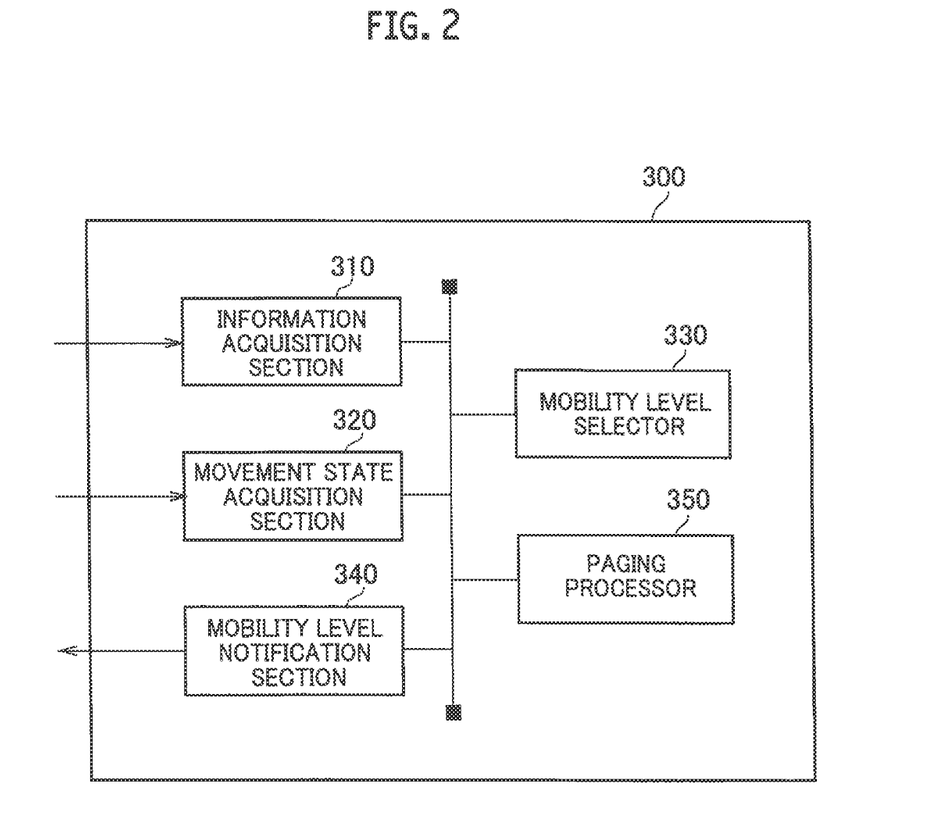
FIG. 2 is a functional block configuration diagram of an ME 300.

FIG. 2 is a functional block diagram of the ME 300. As illustrated in FIG. 2, the ME 300 includes an information acquisition section 310, a movement state acquisition section 320, a mobility level selector 330, a mobility level notification section 340, and a paging processor 350.

The information acquisition section 310 acquires information (user information) on the UE 100 connected, specifically, attached, to the radio access network 20.

The user information indicates at least one of an attribute and a state of the UE 100. The attribute indicates a feature or a characteristic of the UE 100, which the UE 100 carries beforehand, or is required for the UE 100 in advance. Examples of one attribute include the type of the UE 100, the required quality of service (QoS), and the delay time (Latency).

The state indicates an appearance or circumstances of the UE 100, which can vary depending on the usage mode of the UE 100. Examples of the state include the movement frequency and the moving speed of the UE 100, and the traffic pattern of data transmitted and received by the UE 100. In addition, the type of the radio access network 20 to which the UE 100 is connected (attached) and the type of a core network provided by the UP function 40 are included in the state of the UE 100.

The movement state acquisition section 320 acquires the movement state of the UE 100. The movement state means, as described above, the movement frequency or the movement degree of the UE 100.

Specifically, the movement state acquisition section 320 is capable of acquiring the occurrence or non-occurrence of movement (Location change) of the UE 100, and the timing of the movement of the UE 100. More specifically, the movement state acquisition section 320 acquires a Location change reported by the UE 100, and time information indicating the time the Location change occurs. Note that the timing when a location change occurs does not necessarily have to be indicated by the time information, but may be indicated by an elapsed time from a specified time.

In addition, the movement state acquisition section 320 may acquire whether the UE 100 has moved from a specified unit area to another unit area. Specifically, the movement state acquisition section 320 acquires whether the UE 100 has moved from a visited tracking area (TA) to another tracking area.

Note that a tracking area is a unit area formed of one or more cells, managed on the core network, and indicating the location of the UE 100.

The mobility level selector 330 selects a mobility level out of multiple mobility levels as a mobility level associated with the UE 100. Specifically, the mobility level selector 330 selects a mobility level out of the multiple mobility levels based on the movement state of the UE 100 acquired by the movement state acquisition section 320.

In this embodiment, as shown in Table 1, four levels are defined from levels 0 to 3 as mobility levels (IMM) of the UE 100 in the idle mode.

TABLE 1

| IMM Level | Type of IMM | PDN Connection | IMM Support | NW Tracking | Paging Possible | NW Data download possible when UE is idle |
|---|---|---|---|---|---|---|
| 0 | No idle mode | May be | No | No | No | No |
| 1 | No mobility | Yes | Yes | No | Yes | No |
| 2 | Limited mobility | Yes | Yes | Yes | Yes (Fixed TA) | Yes |
| 3 | Full mobility | Yes | Yes | Yes | Yes (Multiple TAs) | Yes |

Note that since the idle mode does not exist at level 0, the mobility levels in the idle mode to be discussed here are levels 1 to 3. At level 1 (No mobility), when the UE 100 has made a transition to the idle mode, the core network cannot track the UE 100 and cannot reach the UE 100. However, the UE 100 can keep PUN Connection for a certain period to allow the core network to page the UE 100. This allows data transmission to the UE 100 in the idle mode.

Level 2 (Limited mobility) is applied when the movement of the UE 100 remains within a specific TA (Fixed TA). At level 2, the UE 100 does not need to transmit TAU (TA Update) periodically.

Level 3 (Fail mobility) is applied when the UE 100 moves across multiple TAs. At level 3, the UE 100 transmits TAU (TA Update) to the core network (CP function 30).

As described above, the mobility level selector 330 can select the suitable mobility level at that time depending on the movement state of the UE 100, which can change with the lapse of time. In other words, the mobility level selector 330 is capable of dynamically changing the mobility level set for the UE 100.

The mobility level selector 330 can select the mobility level based on the occurrence or non-occurrence of movement of the UE 100 and the timing of the movement, acquired by the movement state acquisition section 320. For example, the mobility level selector 330 selects a mobility level (one of levels 1 to 3) corresponding to the movement frequency of the UE 100 (for example, one movement per hour) calculated based on the occurrence or non-occurrence of movement and the timing.

In addition, the mobility level selector 330 can select the mobility level based on the movement of the UE 100 from a specific TA (specified unit area) to another TA (another unit area). Specifically, when the UE 100 moves to another TA, for example, when the UE 100 moves from a tracking area A1 to a tracking area A2 illustrated in FIG. 1, the mobility level selector 330 selects level 3 (Full mobility) as the mobility level of the UE 100.

Moreover, the mobility level selector 330 can select the mobility level based on the movement state of the UE 100 and the user information acquired by the information acquisition section 310. For example, the mobility level selector 330 can select the mobility level based on the type of the UE 100 (enhanced mobile broadband (eMBB), machine type communication (MTC)) in addition to the movement state of the UE 100. Specifically, if the type of the UE 100 is MTC, the mobility level selector 330 basically selects the mobility level for low movement frequency (level 1) as a default setting, and only when the movement frequency or the movement degree becomes high, the mobility level selector 330 can select another mobility level (such as level 2).

The mobility level notification section 340 notifies the UE 100 of the mobility level set for the UE 100. Specifically, the mobility level notification section 340 notifies the UE 100 of the mobility level selected by the mobility level selector 330, and inquires whether the UE 100 supports the selected mobility level.

Note that a control channel or a common data channel can be used for the notification of the selected mobility level to the UE 100.

The paging processor 350 performs processing related to paging the UE 100. Specifically, the paging processor 350 receives a paging request from the CP function 30, and transmits a paging signal to the UE 100 based on the paging request.

(3) Operation of Radio Communication System

Next, descriptions will be provided for operation of the radio communication system 10. Specifically, descriptions will be provided for operation of dynamically changing the mobility level set for the UE 100 and operation of paging the UE 100 in the idle mode.

(3.1) Communication Sequence

Figure 3:
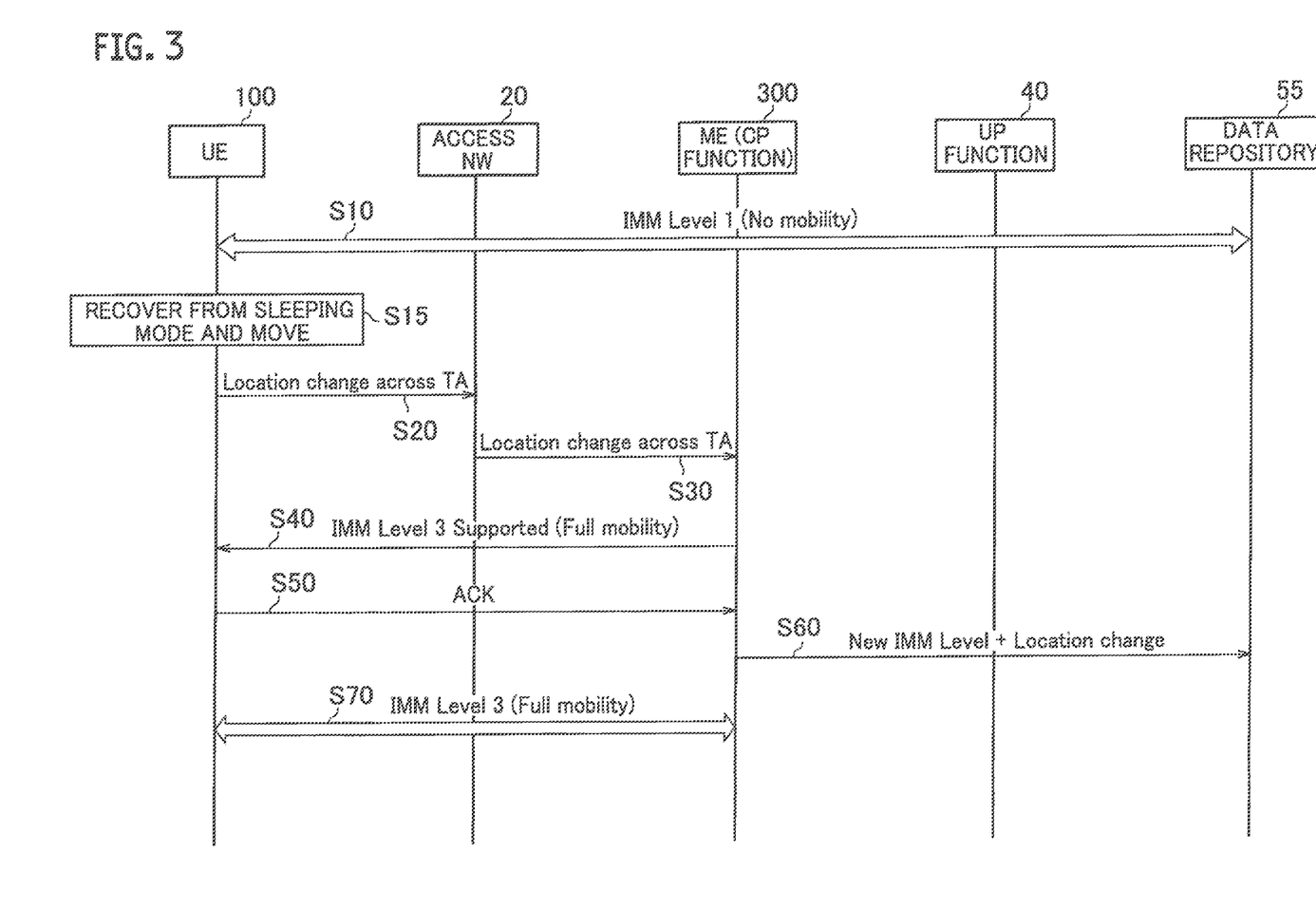
FIG. 3 is a diagram illustrating a communication sequence for changing the mobility level (from level 1 to level 3) set for UE 100.
Figure 4:
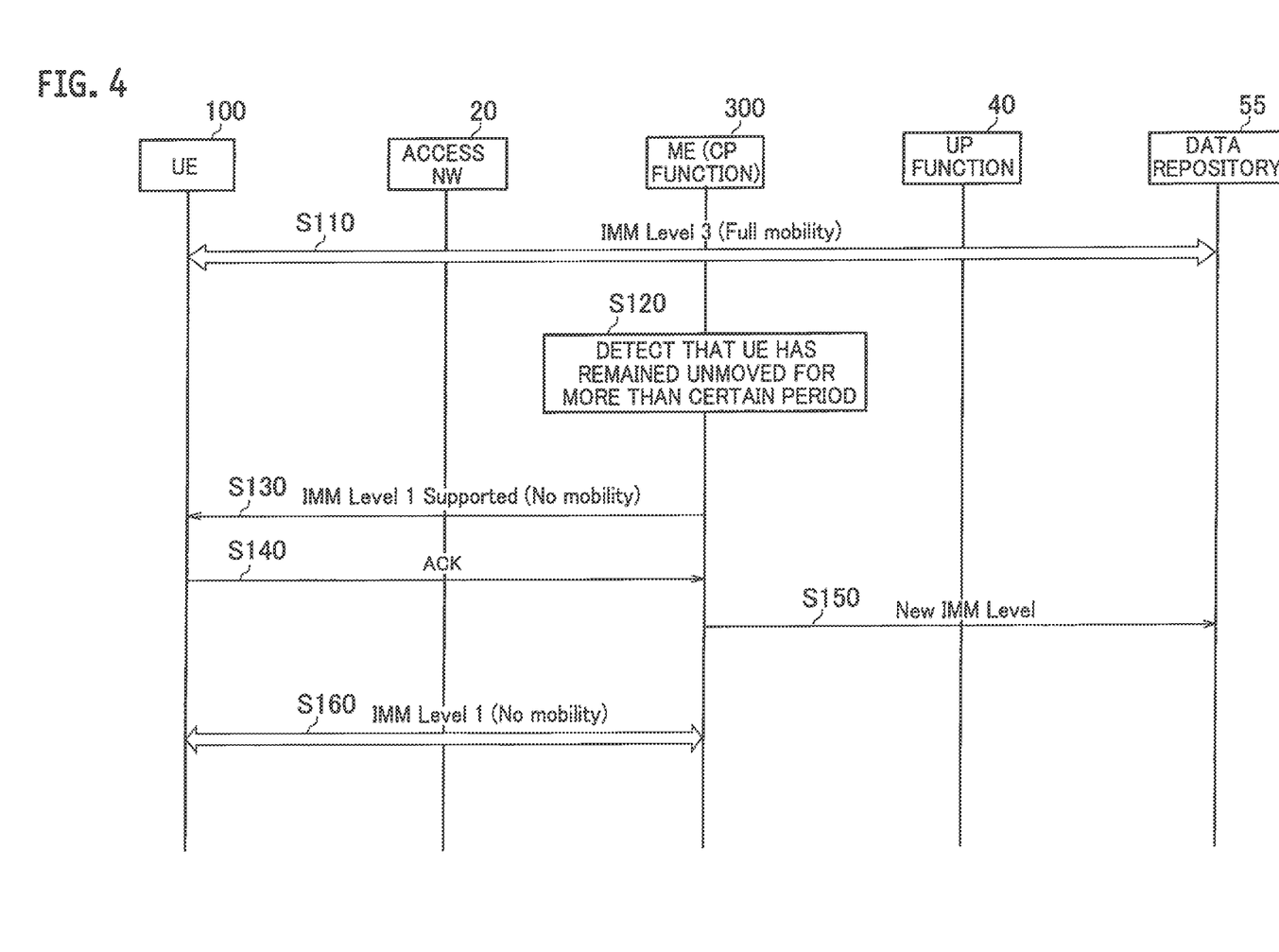
FIG. 4 is a diagram illustrating a communication sequence for changing the mobility level (from level 3 to level 1) set for the UE 100.

FIGS. 3 and 4 illustrate a communication sequence for changing the mobility level set for the UE 100. Specifically, FIG. 3 illustrates a communication sequence for changing IMM from level 1 to level 3, and FIG. 4 illustrates a communication sequence for changing IMM from level 3 to level 1.

Figure 5:
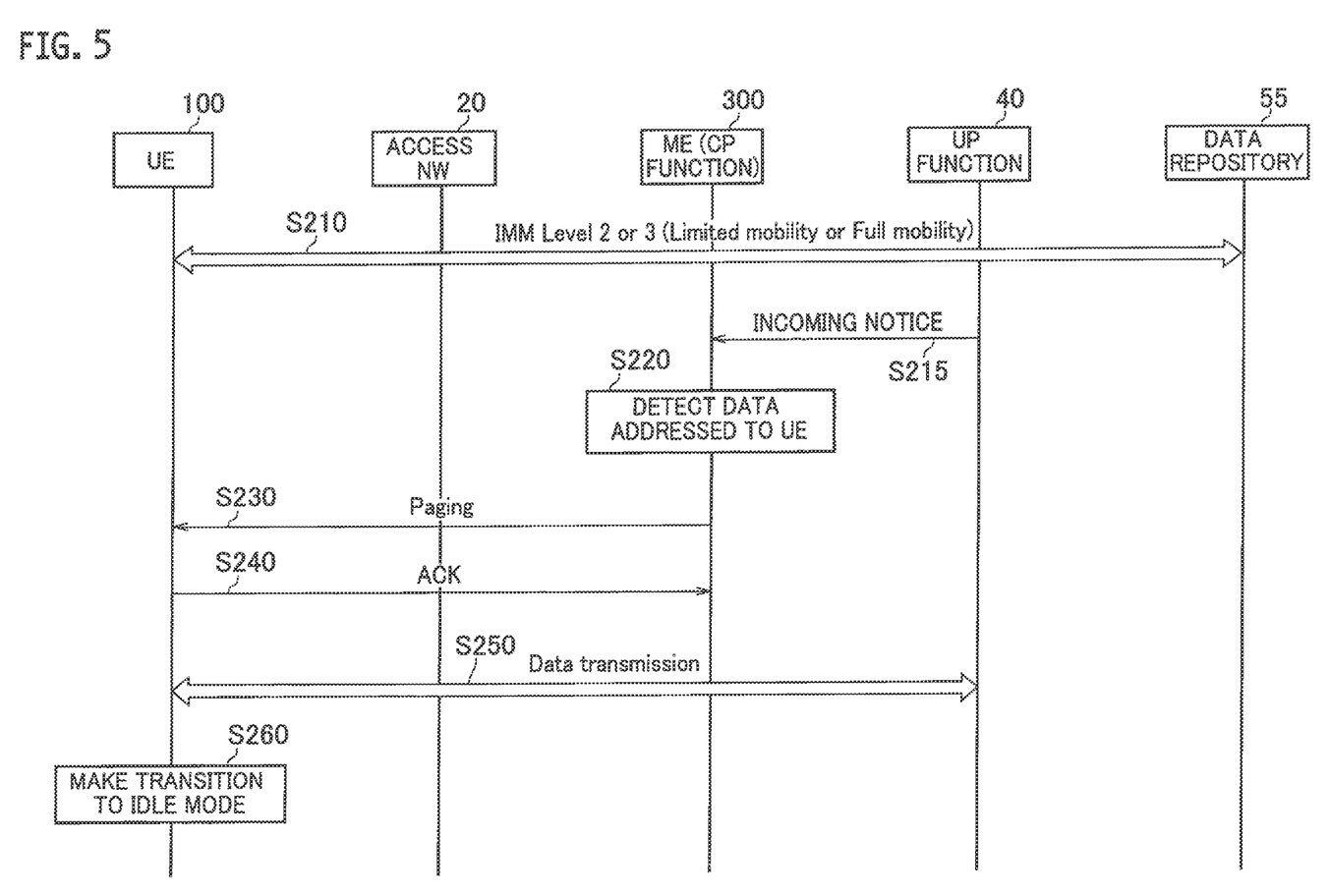
FIG. 5 is a diagram illustrating a communication sequence for paging the UE 100.

FIG. 5 illustrates a communication sequence for paging the UE 100.

In this embodiment, a use case as described below is assumed. That is, the UE 100 connected to a temperature sensor is initially installed on an indoor wall, and the low mobility level (level 1) is set for the UE 100. Later, to use the UE 100 for another purpose, the UE 100 is relocated to a vehicle that moves at a high speed, and the high mobility level (level 3) is set for the UE 100. Afterward, as the vehicle with the UE 100 installed stops for a certain period, the low mobility level (level 1) is set again for the UE 100.

(3.1.1) Change of Mobility Level (from Level 1 to Level 3)

As the UE 100 is installed on an indoor wall and the low mobility level (level 1) is set for the UE 100 as illustrated in FIG. 3 (S10). In addition, after the mobility level is set, the UE 100 transmits data (for example, the set IMM level or the like) to the data repository 55.

Note that the selection of the level 1 may be made based on the fact that the UE 100 is user device for IoT (MTC) connected to a temperature sensor, in other words, based on the type of user device, or alternatively may be made based on a result of checking the movement state of the UE 100 for a specified time.

Later, the UE 100 is relocated to a vehicle that moves at a high speed. The UE 100 recovers (wakes up) from a sleeping mode at specified timings and detects movement of the UE 100 (S15).

The UE 100 notifies the ME 300 via the radio access network 20 that the UE has moved from one tracking area (TA) to another (Location change across TA) (S20, S30). The Location change across TA stay include the movement and an identifier (cell ID) of a cell forming the TA.

Responding to the change of the movement state of the UE 100, the ME 300 selects level 3 as the mobility level for the UE 100. The ME 300 notifies the UE 100 of level 3, and inquires whether the UE 100 supports the selected level (340). The UE 100 returns an acknowledgment (ACK) indicating that the UE 100 supports level 3 of IMM (S50).

The ME 300 reports to the data repository 55 that the IMM level set for the UE 100 has been changed to level 3 and that the location of the UE 100 has moved (S60).

The data repository 55 stores the information reported from the ME 300. This information is useful to understand movement frequency at which the UE 100 moves from one TA to another.

As a result, the high mobility level (level 3) is set for the UE 100, and the UE 100 is tracked by the core network (ME 300) (S70).

(3.1.2) Change of Mobility Level (from Level 3 to Level 1)

As illustrated in FIG. 4, the high mobility level (level 3) is continuously set for the UE 100 and the UE 100 transmits data (such as the set IMM level) to the data repository 55 (S110).

Later, the vehicle with the UE 100 installed stops for a certain period, end the ME 300 detects that the UE 100 has remained unmoved for more than a certain period (S120). Note that by periodically acquiring information indicating the location of the UE 100, the ME 300 can detect that the UE 100 has remained unmoved for more than a certain period. Note that the information indicating the location of the UE 100 may be a cell ID, more specific locational information indicating the longitude and the latitude, or information of a Global Positioning System (GPS).

Responding the change of the movement state of the UE 100, the ME 300 selects level 1 as the mobility level of the UE 100. The ME 300 notifies the UE 100 of level 1 and inquires whether the UE 100 supports the selected level (S130). The UE 100 returns an acknowledgment (ACK) indicating that the UE 100 supports level 1 of IMM (S140).

The ME 300 reports to the data repository 55 that the IMM level set for the UE 100 has been changed to level 1 (S150).

As a result, the low mobility level (level 1) is set for the UE 100 and the UE 100 is managed by the core network (ME300) (S160).

(3.1.3) Paging

As illustrated in FIG. 5, here, a mobility level of level 2 or 3 is set for the UE 100, and the UE 100 transmits data (such as the set IMM level) to the data repository 55 (S210). Note that as described above, in the case where the mobility level of the UE 100 is level 1, and where the UE 100 is in the idle mode, the core network cannot track the UE 100 and cannot reach the UE 100.

Then, when data addressed to the UE 100 are arisen, the UP function 40 transmits to the ME 300 an incoming notice indicating the existence of the data addressed to the UE 100 (S215).

The ME 300 detects that the data addressed to the UE 100 (incoming data) have been arisen based on the incoming notice (S220). Specifically, the CP function 30 is notified with the incoming data reaching the UP function 40 as a trigger. Based on such an incoming notification, the ME 300 detects that the data addressed to the UE 100 have been arisen (S220).

Responding to the arising of data addressed to the UE 100, the ME 300 transmits a paging signal to the UE 100 (S230). The UE 100 returns an acknowledgment (ACK) to the paging (S240).

The UE 100 establishes connection (PDN Connection) necessary for data reception based on the paging, and receives (and transmits) data via the UP function 40 (S250).

The UE 100 makes a transition to the idle mode upon a lapse of a specified time after completing reception (and transmission) of the data (S260).

(3.2) Mobility Level Selection Procedure

Figure 6:
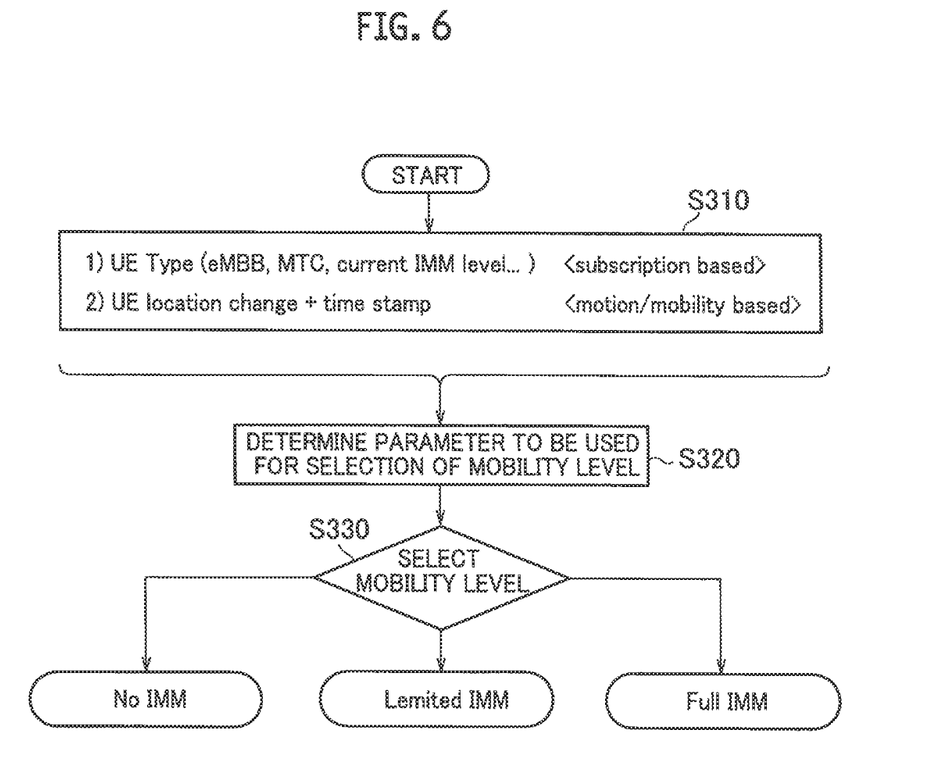
FIG. 6 is a diagram illustrating a procedure for the ME 300 selecting a mobility level.

FIG. 6 illustrates procedure for the ME 300 selecting a mobility level. Specifically, FIG. 6 illustrates operation procedure for selecting a mobility level at step S40 in FIG. 3 and at step S130 in FIG. 4, described above.

As illustrated in FIG. 6, the ME 300 acquires information indicating the type of the UE 100 (user information) and information on the movement of the UE 100 (S310). Specifically, the ME 300 acquires the following information.

1) The type of the UE (enhanced mobile broadband (eMBB), machine type communication (MTC))
2) Occurrence or non-occurrence of movement (Location change) of the UE 100, and the timing (time stamp)

Note that <subscription based> means it is based on a contract with a network operator, and <motion/mobility based> means it is based on a movement state of the UE 100.

The ME 300 determines a parameter to be used for the selection of a mobility level based on the acquired information (S320). Specifically, the ME 300 selects a parameter to be used for the selection of a mobility level out of the parameters included in the multiple pieces of information described above. Note that the number of selected parameters may be single or plural.

The ME 300 selects a mobility level based on the contents (values) of those selected parameters (S330). Specifically, the ME 300 selects one of the following as an IMM.

No mobility (No IMM) (level 1)
Limited mobility (Limited IMM) (level 2)
Full mobility (Full IMM) (level 3)

(4) Advantageous Effect

According to the embodiment described above, the following advantageous effect can be obtained. Specifically, the ME 300 selects a suitable mobility level corresponding to the movement state out of the multiple mobility levels (levels 1 to 3) based on the movement state of the UE 100.

Hence, even in the case where the mobility level of the UE 100 in the idle mode dynamically changes, it is possible to dynamically select a suitable mobility level. More specifically, the ME 300 can select a suitable mobility level as appropriate depending on the movement, state of the UE 100 that can change. In addition, by appropriately selecting mobility levels for low movement frequency, it is possible to achieve both reduction of a management load on the UE 100 and improvement of quality of service, at a higher level.

In contrast, in the idea of multiple mobility levels described in the prior art document, one of the mobility levels is set fixedly to the UE 100, and such mobility level setting cannot deal with the case where the movement state of the UE 100 dynamically changes.

In addition, in this embodiment, the ME 300 can select a mobility level based on the occurrence or non-occurrence of the movement (Location change) of the UE 100 and the timing (time stamp) of the movement of the UE 100. As a result, when the movement stats of the UE 100 changes, the ME 300 can select a suitable mobility level quickly and reliably.

Moreover, in this embodiment, the ME 300 can select a mobility level based on whether the UE 100 has moved from the visited tracking area (TA) to another tracking area. As a result, even in the case where the UE 100 has made a large movement such as moving across TAs, it is possible to quickly and reliably select a suitable mobility level.

In this embodiment, the ME 300 can select a mobility level based not only on the movement state of the UE 100, but also on the user information such as the type of the UE 100. This can contribute to selection of a more substantial mobility level with features of the UE 100 (for example, user device for MTC having a low mobility level) taken into consideration.

(5) Other Embodiments

Although the details of the present invention have been disclosed along with the embodiments as above, the present invention is not limited to the above descriptions. It is apparent to those skilled in the art that various modifications and improvements thereto are possible.

For example, the block diagram used for explaining the above embodiments illustrates a functional block diagram. These functional blocks (constituent sections) are implemented by an arbitrary combination of hardware and/or software. In addition, the method of implementing each functional block is not particularly limited. In other words, functional blocks may be implemented either by a single device formed of physical and/or logical combinations, or multiple devices formed by connecting directly and/or indirectly (for example with wires and/or wirelessly) two or more devices physically and/or logically separated.

Figure 7:
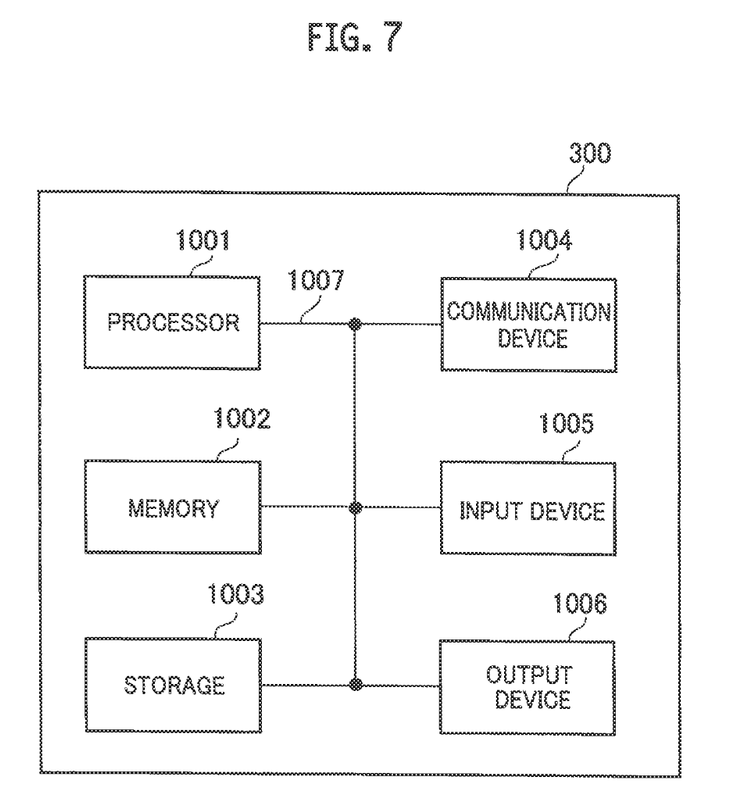
FIG. 7 is a diagram illustrating an example of a hardware structure of the ME 300.

Moreover, the ME 300 described above may function as a computer that performs processing of the radio communication method according to the present, invention. FIG. 7 is a diagram illustrating an example of a hardware structure of the ME 300. As illustrated in FIG. 7, the ME 300 may be configured as a computer device including a processor 1001, a memory 1002, a storage 1003, a communication device 1004, an input device 1005, an output device 1006, a bus 1007, and the like.

The processor 1001, for example, controls the entire computer, running an operating system. The processor 1001 may be formed of a central processing unit (CPU) including an interface with peripheral devices, a control device, a computation device, a register, and the like.

The memory 1002 is a computer-readable recording medium, which may be formed of at least one of, for example, ROM (read only memory), EPROM (erasable programmable ROM), EEPROM (electrically erasable programmable ROM), RAM (random access memory), and the like. The memory 1002 may be called a register, a cache, a main memory, or the like. The memory 1002 is capable of storing a program (program codes), and a software module, and the like that can execute a method according to the embodiments described above.

The storage 1003 is a computer-readable recording medium, which may be formed of at least one of, for example, an optical disc such as a CD-ROM (Compact Disc ROM), a hard disk drive, a flexible disk, a magneto-optical disk (for example, a Compact Disc, a Digital Versatile Disc, a Blu-ray (registered trade mark) Disc), a smart card, a flash memory (for example, a card, a stick, a key drive), a floppy (registered trade mark) disk, a magnetic strip, and the like. The storage 1003 may be called an auxiliary storage device.

The above described memory medium may be, for example, a database, a server, or another suitable medium including the memory 1002 and/or the storage 1003.

The communication device 1004 is hardware (a transmission reception device) for communication between computers via a wired and/or wireless network, and is also called, for example, a network device, a network controller, a network card, a communication module or the like.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. Note that the input device 1005 and the output device 1006 may be integrated into a single unit (for example, a touch panel).

In addition, the devices such as the processor 1001 and the memory 1002 are connected to each other with the bus 1007 to communicate information. The bus 1007 may be formed of a single bus or formed of multiple different bases depending on the devices.

In addition, the method of communicating information is not limited to the embodiments described above, but other methods can be used. For example, the communication of information may be implemented with physical layer signaling (for example, downlink control information (DCI), uplink control information (UCI)), upper layer signaling (for example, RRC signaling, medium access control (MAC) signaling, broadcast information (master information block (MIB)), system, information block (SIB)), or other signals, or combinations of these. RRC signaling may be called an RRC message, and may be, for example, an RRC Connection Setup message, an RRC Connection Reconfiguration message, or the like.

Moreover, inputted or outputted information may be stored in a specific location (for example, a memory), or may be managed with a management table. Inputted or outputted information can be overwritten or updated, or additional information can be added to it. Outputted information may be deleted. Inputted information may be transferred to another device.

The sequences, flowcharts, and the like in the embodiments described above may be rearranged in order unless it causes a contradiction.

In addition, a certain operation performed by the ME 300 in the above-described embodiments is performed by another network node (device) in some cases. Moreover, the functions of the ME 300 may be provided by a combination of other multiple network nodes. Further, the functions of the paging processor 350 may be implemented by another device constituting the CP function 30.

Note that the terms used in the descriptions of this specification and/or terms necessary to understand this specification may be replaced with terms having the same or similar meanings. For example, a channel and/or a symbol may be a signal, or a signal may be a message. In addition, the terms "system" and "network" may be used interchangeably.

Moreover, the above-described parameters and the like may be expressed by absolute values, by relative values from specified values, or by other associated information. For example, radio resources may be instructed by an index.

A BS 200 (base station) can accommodate one or more (for example, three) cells (also called sectors). When a base station has multiple cells, the entire coverage area of the base station can be divided into multiple smaller areas. Each smaller area can also provide communication services using subsystem of the base station (for example, an indoor small base station RRH: remote radio head).

The term "cell" or "sector" means part or the whole of the coverage area provided by a base station and/or a subsystem of the base station that provide communication services in this coverage. Further, the terms "base station", "eNB", "cell", and "sector" can be used interchangeably in this specification. In some cases, a base station is also called terms such as a fixed station, a NodeB, an eNodeB (eNB), an access point, a femtocell, and a small cell.

The UE 100 is also called in some cases by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

"The expression "based on" used in this specification does not mean "based only on" unless explicitly stated otherwise. In other words, the expression "based on" means both "based only on" and "based at least on".

In addition, the terms "including", "comprising", and other variations thereof are intended to be comprehensive as with "comprise". Moreover, the term "or" used in this specification or the scope of claims is intended not to be exclusive disjunction.

Although the embodiments of the present invention have been described as above, it should not be understood that the descriptions and the drawings that constitute part of this disclosure limit the present invention. From this disclosure, various alternative embodiments, examples, and operation techniques will be easily found by those skilled in the art.

Note that the entire contents of Japanese Patent Application No. 2016-097251 (filed on May 13, 2016) are incorporated in this specification by reference.

INDUSTRIAL APPLICABILITY

The mobility level control device and the mobility level control method described above make it possible to select a suitable mobility level even when the mobility level of the user device in the idle mode dynamically changes.

EXPLANATION OF REFERENCE NUMERALS 10 radio communication system
20 radio access network
30 CP function
40 UP function
50 external network
55 data repository
100 UE
200 BS
300 ME
310 information acquisition section
320 movement state acquisition section
330 mobility level selector
340 mobility level notification section
350 paging processor
1001 processor
1003 storage

The invention claimed is:

1. A mobility level control device comprising a processor, wherein:
   the processor controls a mobility level of a user device in an idle mode depending on a movement state of the user device indicated by user information;
   the processor acquires the user information;
   the processor selects a mobility level out of a plurality of the mobility levels, wherein the selection is made in response to the movement state, a type of the user device and a delay time; and
   the processor performs paging on the user device based on the mobility level selected by the processor,
   wherein the movement state indicates a movement degree of the user device, and
   wherein the user information comprises a traffic pattern of data transmitted and received by the user device.

2. The mobility level control device according to claim 1, wherein
   the processor acquires occurrence or non-occurrence of movement of the user device and a timing of the movement of the user device, and
   the processor selects the mobility level based on the occurrence or non-occurrence of movement and the timing.

3. The mobility level control device according to claim 1, wherein
   the processor acquires whether the user device has moved from a specified unit area to another unit area, and
   the processor selects the mobility level based on a fact that the user device has moved from the specified unit area to the other unit area.

4. A mobility level control method for a control device, comprising the steps of:
   controlling a mobility level of a user device in an idle mode depending on a movement state of the user device indicated by user information;
   selecting a mobility level, by the control device, out of a plurality of the mobility levels, wherein the selection is made in response to the movement state, a type of the user device and a delay time; and
   performing paging on the user device, by the control device, based on the selected mobility level,
   wherein the movement state indicates a movement degree of the user device, and
   wherein the user information comprises a traffic pattern of data transmitted and received by the user device.

* * * * *